US009433864B2

United States Patent
Reidy (10) Patent No.: US 9,433,864 B2
(45) Date of Patent: Sep. 6, 2016

(54) COMPUTER DEVICE, CONTROL METHOD OF COMPUTER DEVICE, AND STORAGE MEDIUM

(75) Inventor: Gearoid Reidy, Tokyo (JP)

(73) Assignee: Capcom Co., LTD., Osaka-shi (JP)

( * ) Notice: Subject to any disclaimer, the term of this patent is extended or adjusted under 35 U.S.C. 154(b) by 225 days.

(21) Appl. No.: 13/997,177

(22) PCT Filed: Dec. 13, 2011

(86) PCT No.: PCT/JP2011/006955
§ 371 (c)(1),
(2), (4) Date: Jul. 17, 2013

(87) PCT Pub. No.: WO2012/086149
PCT Pub. Date: Jun. 28, 2012

(65) Prior Publication Data
US 2013/0303283 A1    Nov. 14, 2013

(30) Foreign Application Priority Data

Dec. 22, 2010  (JP) ................................. 2010-285301

(51) Int. Cl.
| A63F 9/24 | (2006.01) |
| A63F 13/00 | (2014.01) |
| G06F 17/00 | (2006.01) |
| G06F 19/00 | (2011.01) |
| A63F 13/45 | (2014.01) |
| A63F 13/77 | (2014.01) |
| A63F 13/40 | (2014.01) |
| A63F 13/50 | (2014.01) |

(52) U.S. Cl.
CPC ............... *A63F 13/45* (2014.09); *A63F 13/10* (2013.01); *A63F 13/50* (2014.09); *A63F 13/77* (2014.09); *A63F 2300/632* (2013.01)

(58) Field of Classification Search
CPC .................. A63F 13/45–13/47; A63F 13/50; A63F 13/52; A63F 13/55
See application file for complete search history.

(56) References Cited

FOREIGN PATENT DOCUMENTS

| EP | 1522977 A1 | 4/2005 |
| EP | 2213344 A2 | 8/2010 |

(Continued)

OTHER PUBLICATIONS

"Mario Kart 64," Feb. 10, 1997, Nintendo, instruction manual.*

(Continued)

*Primary Examiner* — Kevin Y Kim
(74) *Attorney, Agent, or Firm* — Alleman Hall McCoy Russell & Tuttle LLP (57) ABSTRACT

Provided is a computer device which changes a demonstration image to be displayed when a game is played next, according to a state of proceeding of a main part of the game, and can attract the user's interest on the demonstration image. The computer device comprises a game proceeding control section (game proceeding control module) which causes a game to proceed in response to a user's manipulation; a game proceeding management section (game proceeding management module) which manages a state of proceeding of the game; and a demonstration image generating/outputting section (demonstration image generating/outputting module) which outputs a demonstration image to a monitor before the game is played; wherein the demonstration image generating/outputting section is configured to change the demonstration image to be output to the monitor before the game is played, according to the state of proceeding of the game.

15 Claims, 6 Drawing Sheets

(56) References Cited

FOREIGN PATENT DOCUMENTS

| JP | 2000126452 A | 5/2000 |
|---|---|---|
| JP | 2007175274 A | 7/2007 |
| JP | 4137759 B2 | 6/2008 |
| JP | 2008136702 A | 6/2008 |

OTHER PUBLICATIONS

"Mario Kart 64 Cheats," Aug. 20, 2001, http://www.neoseeker.com/Games/cheats/N64/mario_kart_64.html.*

"Mario Kart 64," Jun. 28, 2008, https://web.archive.org/web/20080628234320/http://mario.wikia.com/wiki/Mario_Kart_64.*

Mario Kart 64—Intro/Title Screen, uploaded Sep. 2, 2013 but depicting the game copyright 1996, https://www.youtube.com/watch?v=XtGNiXpdvts.*

"World of Warcraft," Blizzard Entertainment, 2004, instruction manual and screenshots from pages: http://www.blizzpub.net/forums/post/569789/#p569789 and https://www.flickr.com/photos/mmohut/3628454886.*

European Patent Office, Extended European Search Report of EP11850550.2, Jan. 8, 2015, Germany, 6 pages.

Japanese Patent Office, International Search Report of PCT/JP2011/006955, WIPO, Mar. 13, 2012, 1 page.

"Dengeki Game Cube", Media Works, Published Oct. 1, 2004, 7 pages.

"Front Mission ~Scars of the War~ Official Perfect Guide", Enterbrain, First Edition, Published Mar. 30, 2006, 6 pages.

Japanese Patent Office, Office Action of Japanese Patent Application No. 2012-549617, Feb. 4, 2014, 6 pages.

\* cited by examiner

| Scene | Check point | Management of check point (state of flage) | Order of clear | Demonstration image |
|---|---|---|---|---|
| Scene 1 "Village" | Check point 1: appear in area (start of main part of game) | ON | 1 | Demonstration image data 1 |
| Scene 2 "Grass field" | Check point 2: arrive in area | ON | 2 | Demonstration image data 2 |
| Scene 3 "City" | Check point 3: arrive in area | OFF | - | Demonstration image data 3 |
| Scene 4 "Fortress" | Check point 4: arrive in area | ON | 3 | Demonstration image data 4 |
| Scene 5 "Mountain" | Check point 5: defeat boss character | OFF | - | Demonstration image data 5 |
| Scene 6 "Cave" | Check point 6: area appear | OFF | - | Demonstration image data 6 |

COMPUTER DEVICE, CONTROL METHOD OF COMPUTER DEVICE, AND STORAGE MEDIUM

TECHNICAL FIELD

The present invention relates to a computer device which presents a demonstration image before a play of a game, a control method of the computer device, and a storage medium.

BACKGROUND ART

In recent game machines, a game program is read in from a storage medium such as a DVD-ROM, and a main part of a game is played in response to a user's manipulation. Upon the game program being read in from the storage medium, a title screen representing a title of the game is displayed on a display. Before or after the title screen is displayed, so-called a demonstration image (or opening image) including a digest image of a content of the game is reproduced. Reproduction of the demonstration image and display of the title screen are repeated alternately. When the user performs a predetermined manipulation, the reproduction of the demonstration image or the display of the title screen is cancelled, and the play of the main part of the game is initiated.

If the demonstration image reproduced as described above is, for example, a content in which one or plural kinds of image(s) is/are merely reproduced in repetition, the user who sees this content once will become less interested in the demonstration image. Because of this, when the game is played in repetition, the user may skip reproduction of the demonstration image in the second and the following games. However, for example, if a scene which appears at a time point when the game is played until a last phase of a story is incorporated into a demonstration image in a game having a plot, in order to attract the user's interest, the user who does not start the game yet or has not proceeded to the last phase of the story, will previously know the scene or a character which does not appear in the present state of proceeding of the game performed by that user. This may cause some problems in the proceeding of the game, for example, the user may lose the interest in the game.

To avoid this, Patent Literature 1, Patent Literature 2, and the like disclose proposals for changing the demonstration image. Patent Literature 1 discloses a game in which the user manipulates a player character to make a battle with a character selected from another plural characters, in a game machine provided in a game center, etc. In this game, plural movies are joined together to construct a demonstration image, and this demonstration image is reproduced while the game is not being played. A movie which is a portion of the demonstration image is changed to include an image of a character which frequently made a battle with the player character in the past games.

Patent Literature 2 discloses that a mechanical activation time of the game machine is counted, and a demonstration image is changed according to the counted time. More specifically, during a time period in which the counted time does not exceed a predetermined threshold (switching time), the demonstration image relating to a front half portion in the proceeding of the game is reproduced. After the counted time exceeds the predetermined threshold, the demonstration image relating to a rear half portion in the proceeding of the game is reproduced instead of the previous demonstration image.

CITATION LIST

Patent Literature

Patent Literature 1: U.S. Pat. No. 4,137,759
Patent Literature 2: Japanese-Laid Open Patent Application Publication No. 2008-136702

SUMMARY OF THE INVENTION

Technical Problem

There are a variety of kinds of games, for example, a role playing game (RPG) having a plot, an action game in which plural missions are prepared and performed according to a preset order while a play character is being manipulated, a shooting game in which enemy characters are defeated by a gun, a missile, and the like, and areas are moved through, and a simulation game in which a friendly territory is expanded, or steering of an airplane is simulated. In these games, as the number of times the user plays the game increases, a state of the proceeding of the game changes. In other words, the user's achievement point (achievement level) in the game changes. In view of this, if a content of a demonstration image can be changed according to a state of proceeding of the game, the user will show an interest on the demonstration image.

However, in the methods disclosed in Patent Literature 1 and Patent Literature 2, the state of proceeding of the game is not reflected on the demonstration image. That is, in the method disclosed in Patent Literature 1, characters who make a battle with the player character relatively frequently appear on the demonstration image, but the state of proceeding of the game (i.e., achievement level) is not reflected on the demonstration image. In the method of Patent Literature 2, the demonstration image is changed according to the activation time of the game machine, but the activation time does not accurately reflect the state of proceeding of the game. For example, in a case where a user who is familiar with manipulation and a user who is unfamiliar with the manipulation play for the same time, it can be easily understood that their achievement levels (states of proceeding of the game) become different. Therefore, in the method of Patent Literature 2, the state of proceeding of the game is not reflected on the demonstration image, either.

An object of the present invention is to provide a computer device which is capable of changing a content of a demonstration image displayed before a game according to a state of proceeding of the game, a control method of the computer device, and a storage medium.

Solution to Problem

A computer device of the present invention comprises a game proceeding control module which causes a game to proceed in response to a user's manipulation; a game proceeding management module which manages a state of proceeding of the game; and a demonstration image output module which outputs a demonstration image to a display section connected to the computer device before the game is played; wherein the demonstration image output module is configured to change the demonstration image to be output to the display section before the game is played, according to the state of proceeding of the game. In this configuration, since the demonstration image to be displayed when the game is played next changes, according to the state of proceeding of the game, the demonstration image can attract the user's interest.

A check point corresponding to the state of proceeding of the game may be set in the game. The game proceeding management module may be configured to manage whether or not the user has cleared the set check point. The demonstration image output module may be configured to output the demonstration image corresponding to the cleared check point, to the display section. In this configuration, every time the user clears a new check point, a new demonstration image can be displayed. The demonstration image is not limited to a pre-render movie in which an image is created in advance, but may be a real time rendering movie which is created as desired when the image is displayed. For example, in a case where the pre-render movie is used, a movie having a higher quality than the image of the game can be displayed while quickly switching the scene. By comparison, in a case where the real time rendering movie is used, a scene actually played by the user in the middle of the game can be reproduced, or a demonstration image in which a character brought up by the user appears can be displayed.

The demonstration image may be pre-stored in a storage section which is capable of being accessed by the computer device; and the demonstration image output module may be configured to output the demonstration image corresponding to the cleared check point, of demonstration images stored in the storage section, to the display section. In this configuration, like a case where the pre-render movie is used, a movie having a higher quality can be displayed while quickly switching the scene.

The computer device may further comprise: a virtual game space generating module which generates a virtual game space including a character or an object; wherein the demonstration image output module may be configured to change the demonstration image to be output to the display section, based on the state of proceeding of the game, and an element of the character or the object which is changeable as the game proceeds. In this configuration, the demonstration image which more complies with the state of proceeding of the game can be output. Therefore, the demonstration image can attract the user's interest more.

The game proceeding management module may contain the cleared check point and an order in which the check point is cleared such that the cleared check point and the order are associated with each other; and the demonstration image output module may be configured to output the demonstration image corresponding to the check point having been cleared most recently with a priority over another demonstration image. In this configuration, the user can know that a new demonstration image has been added merely by seeing an initial portion of the demonstration image, which can attract the user's interest on the demonstration image.

A method of controlling a computer device of the present invention, comprises the steps of: proceeding a game in response to a user's manipulation; managing a state of proceeding of the game; and outputting a demonstration image to a display section connected to the computer device before the game is played; wherein in the step of outputting the demonstration image, the demonstration image to be output to the display section before the game is played is changed, according to the state of proceeding of the game. A storage medium of the present invention is a storage medium which is computer-device-readable, and contains commands executed by a control section in the computer device, the commands causing the computer device to execute the steps of: proceeding a game in response to a user's manipulation; managing a state of proceeding of the game; and outputting a demonstration image to a display section connected to the computer device before the game is played; wherein in the step of outputting the demonstration image, the demonstration image to be output to the display section before the game is played is changed, according to the state of proceeding of the game. Thus, as described above regarding the computer device, since the demonstration image to be displayed when the game is played next changes, according to the state of proceeding of the game, the demonstration image can attract the user's interest.

Advantageous Effects of the Invention

In accordance with the present invention, it is possible to provide a computer device, a control method of the computer device, and a storage medium, which can change a demonstration image to be displayed when a game is played next, according to the state of proceeding of the game, and can attract the user's interest on the demonstration image.

DESCRIPTION OF THE EMBODIMENTS

Hereinafter, a computer device, a control method of the computer device, and a storage medium according to the present embodiment will be described with reference to the drawings.

[Game System]

Figure 1:
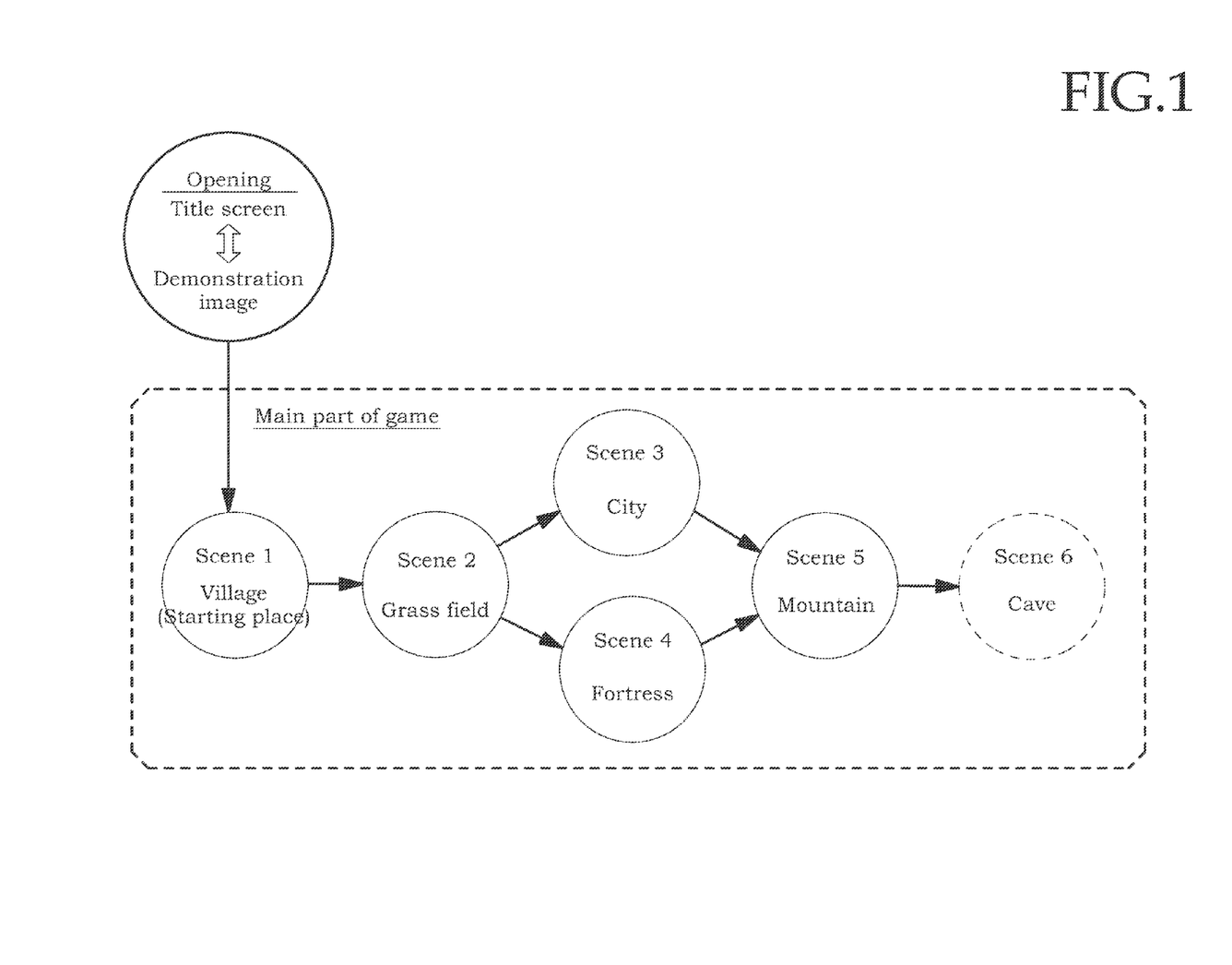
FIG. 1 is a view showing an outline of a game system according to the present embodiment.

FIG. 1 is a view showing an outline of a game system in which "play" can be performed by a computer device according to the embodiment of the present invention, or in such a manner that game programs which are commands stored in a storage medium according to the embodiment of the present invention are executed by the computer device. In the present embodiment, a role playing game (RPG) in which a user manipulates a player character to develop a story will be exemplarily described. As shown in FIG. 1, the present game is composed of "opening" and a "main part" of the game which is played by the user. The "opening" is composed of a title screen and demonstration images, which are displayed on a monitor, before the main part is played.

The main part is composed of a plurality of scenes 1 to 6, and a stage (area) is set for each scene. For example, a scene 1 is a stage in which the user initially performs "play" by manipulating the player character, when the user starts to play the main part. As a stage for scene 1, "village" in which many another characters are present is set. Following scene 1, scenes 2 to 6 are set as stages in which "play" is performed sequentially. Scenes 2 to 6 are set in such a manner that "grass field", "city", "fortress", "mountain", and "cave" are stages, respectively.

In each of scenes 1 to 6, a virtual game space representing a land feature of the stage (area) is preset. The user can cause the player character to act within the virtual game space defining the stage in each scene to be played. The user plays each scene and proceeds to the main part, for example, by collecting information from another character appearing in the virtual game space, acquiring items, or defeating an enemy character. In the "cave" which is the last scene 6, a particular enemy monster (boss character) is defeated, and thus, the main part ends in its story.

Play of each of scene 2 and the following scenes is permitted to be started when a predetermined condition set for the game is satisfied in a previous scene. For example, scene 2 in which the stage is the "grass field" can be played when a preset condition is satisfied, for example, particular information has been collected from a particular person (character), in scene 1 in which the stage is the "village" which is a beginning point.

In the case of the game of FIG. 1, in the proceeding of the game, setting is made so that either scene 3 or scene 4 is played after scene 2 is played. For example, in response to the user's choice or according to an achievement in which, for example, a particular enemy has been defeated or a particular item has been found in scene 2, or the like, either scene 3 or scene 4 can be played. Irrespective of whether scene 3 or scene 4 is played, scene 5 is played subsequently to scene 3 or scene 4. In scene 5, a story is set such that there is a battle with a relatively strong enemy character (enemy monster) in the last phase of scene 5. Scenes 1 to 5 indicated by solid lines in FIG. 1 can be displayed on maps on the game screen from a time point at which the present game starts, while scene 6 indicated by a broken line in FIG. 1, which is ranked as the last scene in the proceeding of the game, is not displayed before predetermined conditions preset in scenes 1 to 5 have been satisfied. The contents and the number of the scenes are not limited to the above and may be set as desired.

[Computer Device]

Figure 2:
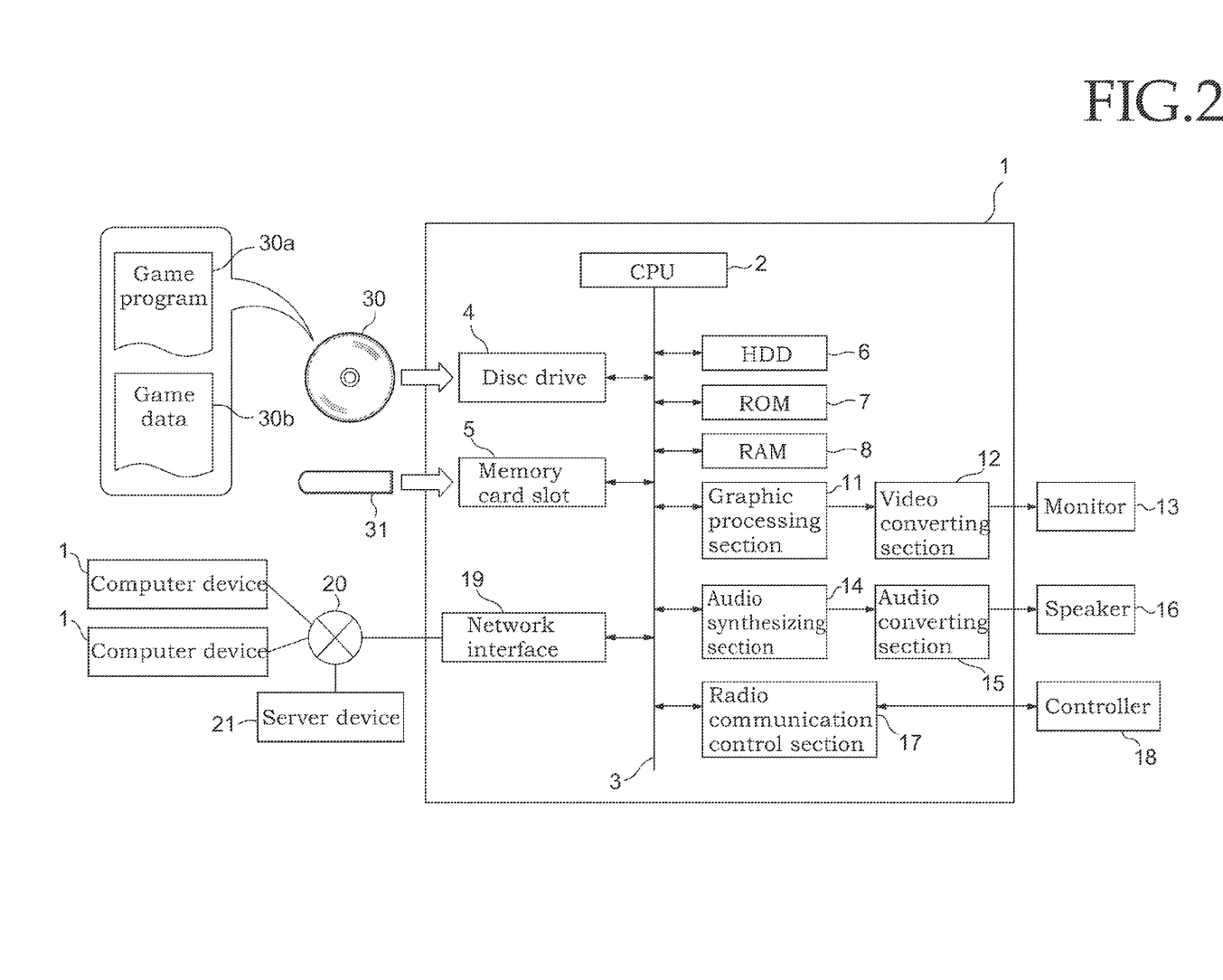
FIG. 2 is a block diagram of a computer device 1 according to the present embodiment.

Next, the computer device 1 according to the present embodiment will be described. FIG. 2 is a block diagram showing a configuration of the computer device 1. As shown in FIG. 1, the computer device 1 includes a CPU 2 for controlling its operation, and a disc drive 4, a memory card slot 5, an HDD 6, a ROM 7, and a RAM 8 are connected to the CPU 2 via a bus 3.

The disc drive 4 is loaded with a disc-type storage medium (storage medium according to the embodiment of the present invention) 30 such as a DVD-ROM. The disc-type storage medium 30 contains a game program (command) 30a according to the embodiment of the present invention and game data 30b such as texture required to create characters appearing in the game or game scenes, which will be described in the present embodiment. The memory card slot 5 is loaded with a card-type storage medium 31, and is able to store saved data indicating a state of play such as an intermediate step of the main part, in accordance with the command from the CPU 2.

The HDD 6 is a high-capacity storage medium contained in the computer device 1, and contains the game program 30a, the game data 30b, the saved data, etc., which are read in from the disc-type storage medium 30. The ROM 7 is a semiconductor memory such as a mask ROM or PROM and contains a start-up program used to start-up the computer device 1, a program used to control an operation when the disc-type storage medium 30 is loaded, etc. The RAM 8 is constituted by a DRAM, a SRAM, etc. The game program 30a to be executed by the CPU 2, the game data 30b required to execute the game program 30a, etc., are read in the RAM 8 from the disc-type storage medium 30 or the HDD 6 according to the state of play of the game, and stored therein temporarily. For example, in a case where the disc-type storage medium 30 of the present game is loaded into the disc drive 4, the game program 30a and the game data 30b are read from the disc-type storage medium 30 into the RAM 8. Thereby, a title screen representing a title of the present game is displayed for a specified time, and the demonstration images as will be described later are displayed, which take place alternately in repetition, until the user performs a predetermined manipulation input.

A graphic processing section 11, an audio synthesizing section 14, a radio communication control section 17, and a network interface 19 are connected to the CPU 2 via the bus 3.

The graphic processing section 11 draws a game image including the virtual game space, the play character, etc., in each scene in accordance with a command from the CPU 2. An outside monitor 13 is connected to the graphic processing section 11 via a video converting section 12. The game image drawn in the graphic processing section 11 is converted into a motion picture format in the video converting section 12. Then, the image is displayed on the monitor 13.

The audio synthesizing section 14 reproduces and synthesizes a digital game sound in accordance with a command from the CPU 2. An outside speaker 16 is connected to the audio synthesizing section 14 via an audio converting section 15. The audio converting section 15 decodes the game sound reproduced and synthesized in the audio synthesizing section 14 into an analog format, and the game sound is output to outside from the speaker 16.

The radio communication control section 17 includes a radio communication module of 2.4 GHz band. The radio communication control section 17 is connected to a controller 18 belonging to the computer device 1 via radio, and enables data transmission/reception. The user manipulates a manipulation member (not shown) such as a button provided on the controller 18, to input a signal to the computer device 1, which can control motion of the player character displayed on the monitor 13. The network interface 19 connects the computer device 1 to a communication network 20 such as internet, LAN, etc., and enables the computer device 1 to perform communication with another computer device 1 by a client server method or a peer-to-peer method. The computer device 1 is connected to another computer device 1 via the communication network 20, such that data is transmitted and received between them. This allows player characters to move in synchronization with each other within the same virtual game space, and enables multi-play in which the game is progressed through together by several persons.

Although the disc-type storage medium 30 is exemplarily described above as the storage medium of the present invention, the present invention is not limited to this and the storage medium of the present invention may be the card-type storage medium 31, or another storage medium. The storage medium may be configured to store the commands used to cause the computer device 1 to perform functions described below and is not limited to the outside storage medium removably inserted into the computer device 1. For example, in a case where a server device 21 connected to the communication network 20 contains the commands and a computer device which downloads the commands from the server device 21 is the computer device of the present invention, the server device 21 corresponds to the storage medium of the present invention. That is, any computer device which contains the commands as downloaded contents corresponds to the storage medium of the present invention. Moreover, a hard disc built into the computer device may become the storage medium of the present invention, or application (program) downloaded from a server device may become the storage medium of the present invention.

Figure 3:
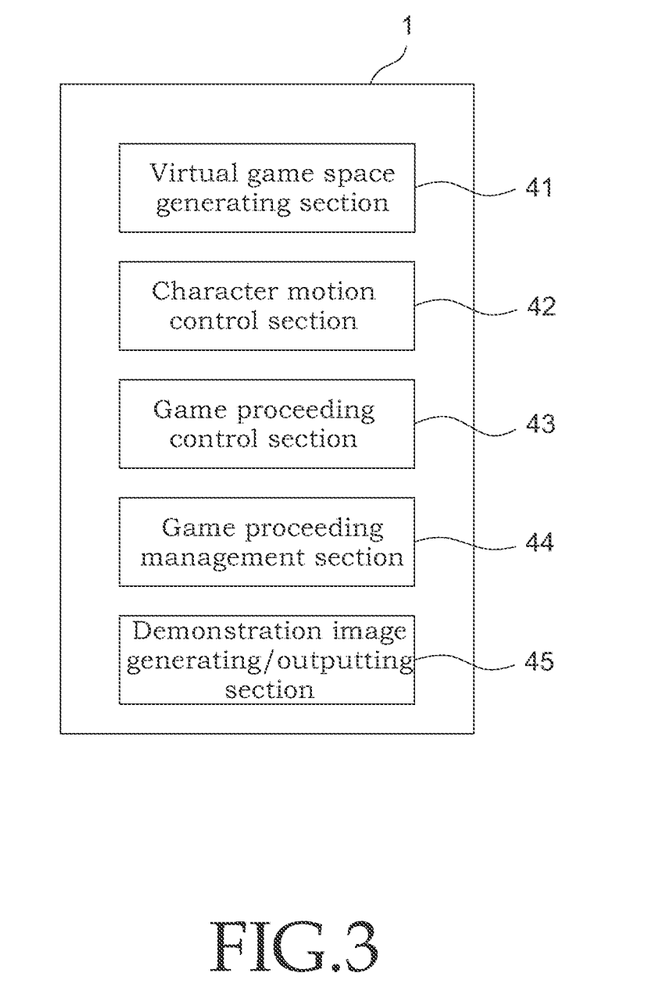
FIG. 3 is a block diagram showing a functional configuration of the computer device of FIG. 2.

FIG. 3 is a block diagram showing a functional configuration of the above stated computer device 1. As shown in FIG. 3, the computer device 1 includes a virtual game space generating section (virtual game space generating module, virtual game space generating means) 41, a character motion control section (character motion control module, character motion control means) 42, a game proceeding control section (game proceeding control module, game proceeding control section) 43, a game proceeding management section (game proceeding management module, game proceeding management means) 44, a demonstration image generating/outputting section (demonstration image generating/outputting module, demonstration image generating/outputting means) 45, etc., and are able to implement functions as described below corresponding to the sections 41 to 45, respectively. Specifically, the functions are configured as the CPU 2, the HDD 6, the ROM 7, the RAM 8, the graphic processing section 11, the video converting section 12, the audio synthesizing section 14, the audio converting section 15, etc., shown in FIG. 2.

The virtual game space generating section 41 is configured to generate the virtual game space set in each scene in which the player character acts, and further generate characters including the player character, who act within the virtual game space and objects arranged within the virtual game space. The virtual game space of the present embodiment is set as a virtual game space having a predetermined three-dimensional space. The player character is able to move within the virtual game space in response to the user's manipulation. The character motion control section 42 is configured to control motions of the characters including the player character and the enemy characters within the virtual game space, in response to the user's manipulation of the controller 18 or the state of proceeding of the game.

The game proceeding control section 43 is configured to control proceeding of the main part composed of the above stated scenes 1 to 6. For example, the game proceeding control section 43 causes a new character to appear or permits play of a next scene in response to the player character's action. The game proceeding management section 44 is configured to manage the state of proceeding of the main part. As will be described in detail later, "check point" (or "juncture") is preset in the main part of the present game according to the state of proceeding of the main part. When this check point is cleared, the game proceeding management section 44 switches the corresponding flag from OFF to ON, and thus manages the state of proceeding of the main part. In this way, in the present embodiment, the game proceeding management section 44 manages the state of proceeding of the main part based on the state of the flag, but the present invention is not limited to this, and another method may be used so long as which of the check points in the main part the user has proceeded to. The demonstration image generating/outputting section 45 is configured to output the demonstration image to the monitor 13 at the time of the opening before the main part is played, and further suitably change (or generate) the demonstration image to be output at the time of the opening which will take place thereafter, according to a past state of proceeding of the main part.

In the proceeding of the computer device 1, control steps represented by the above functions implemented by the virtual game space generating section 41, the character motion control section 42, the game proceeding control section 43, the game proceeding management section 44, and the demonstration image generating/outputting section 45 constitute examples of a virtual game space generating step, a character motion control step, a game proceeding control step, a game proceeding management step, and a demonstration image generating/outputting step.

Figure 4:
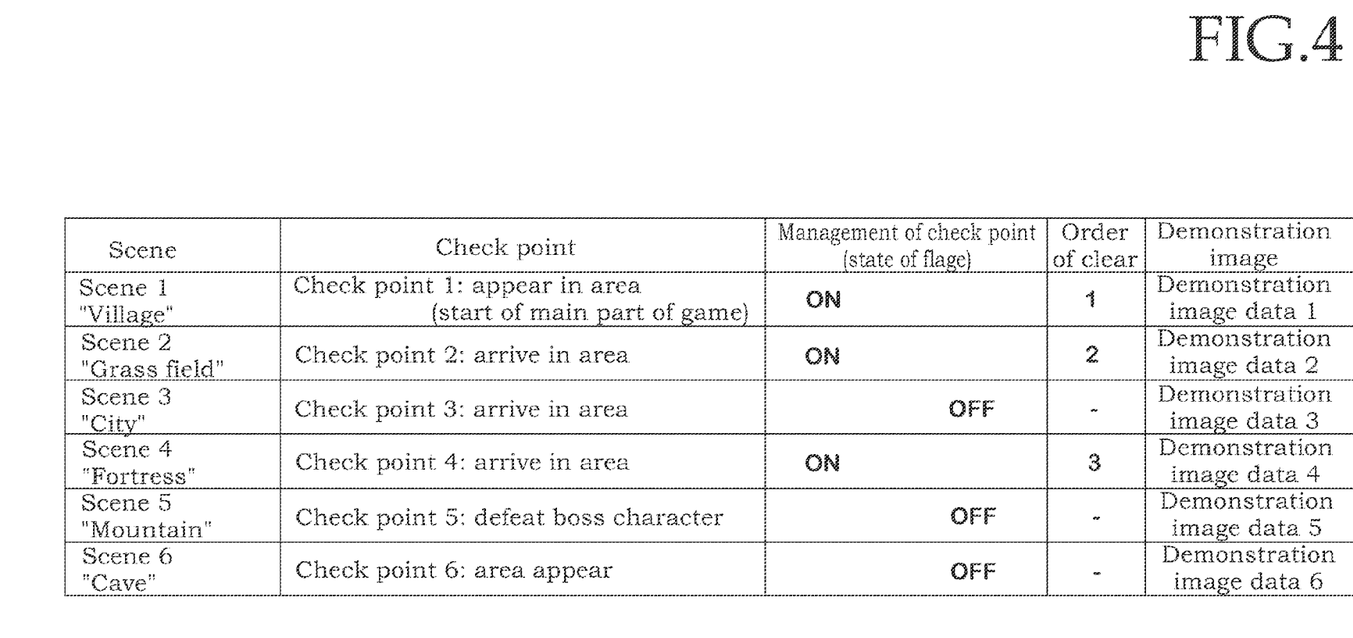
FIG. 4 is a view showing check points set in a main part of a game and the associated demonstration images.

FIG. 4 is a view showing check points set in the main part and the associated demonstration images. As shown in FIG. 4, in the present game, check points 1 to 6 are preset to correspond to scenes 1 to 6, respectively, composing the main part. For example, for scene 1, a time point (i.e., time point when the player character appears firstly in the area of "village" which is the stage) when the play of the main part starts firstly is set as the check point 1. For scenes 2 to 4, time points (or time points when the game data 30b relating to the respective areas are loaded from the disc-type storage medium 30 to the computer device 1) when the user has firstly reached the areas corresponding to the respective stages are set as the check points 2 to 4, respectively.

In scene 5, as described above, the player character makes a battle with the strong enemy monster in the last phase. A time point when the player character has defeated the enemy monster is set as the check point 5. Further, in scene 6, the "cave" which is the stage is allowed to appear on the maps when predetermined conditions are satisfied while scenes 1 to 5 are being played. The appearance of this "cave" is set as the check point 6.

Although in the example of FIG. 4, one check point is set in one scene, the present invention is not limited to this, and two or more check points may be set in one scene, or there may exist a scene in which no check point is set. The contents of the check points are not limited to the above stated contents, but may be, for example, such that predetermined thresholds are set in parameters such as an experience point and an offensive power of the player character which are changeable according to the proceeding of the game, and these thresholds are set as the check points. Or, an event in which the player character has met a particular character, an event in which the player character has spoken with the particular character, an event in which the player character has acquired a particular item, etc., may be set as the check points.

The game proceeding management section 44 of the computer device 1 manages whether or not the above stated check point has been cleared, that is, which of the check points the user has reached in the proceeding of the main part, based on the flag corresponding to each check point. For example, in a case where the main part is not played at all yet, regarding a particular game program 30a, all of the flags corresponding to the above stated check points are set as "OFF". When the main part is played and every time the check point is cleared, the flag corresponding to the cleared check point is switched to "ON". Therefore, according to the state (ON or OFF) of each flag, the state of proceeding of the main part can be known. Data indicating the states of the flags are stored in the RAM 8 during the play of the game, and stored in the card-type storage medium 31 as saved data at the end of the game. In a case where the game is resumed after the game has been saved and ended once, the game can be played from a state in which the game was ended previously, using the saved data. In the example shown in FIG. 4, the check points 1, 2, and 4 are cleared, and as a result the corresponding flags are switched to ON, while flags corresponding to the other check points remain OFF.

As shown in FIG. 4, the check points and the order (i.e., order in which the flags have been switched to ON) in which the check points have been cleared are stored such that the check points and the order are associated with each other. In the example shown in FIG. 4, the order in which the check points 1, 2, and 4 corresponding to scenes 1, 2, and 4 have been cleared, is 1, 2, and 3. Therefore, it can be seen that the check points have been cleared in this order. The data indicating the order in which the check points are cleared is stored in the HDD 6 during the play of the game, and stored in the card-type storage medium 31 as the saved data at the end of the game. Alternatively, the saved data may be stored in the HDD 6 instead of the card-type storage medium 31.

Furthermore, in the present game, demonstration image data 1 to 6 corresponding to the check points 1 to 6, respectively, are provided. These demonstration image data are different in content, and are images for a predetermined time (e.g., 20 seconds) relating to the corresponding check points (or scenes for which the check points are set). For example, the demonstration image data 1 has a content representing a digest of how the "village" which is the stage of scene 1 is. The demonstration image data 5 has a content representing how the enemy monster is acting violently in the "mountain" which is the stage of scene 5. The demonstration image data are created in advance as pre-render movies and stored as the game data 30b in the disc-type storage medium 30. As will be described next, the demonstration image data are appropriately read in by the function of the demonstration image generating/outputting section 45 and output to the monitor 13 at the time of the opening before the main part is played.

Figure 5:
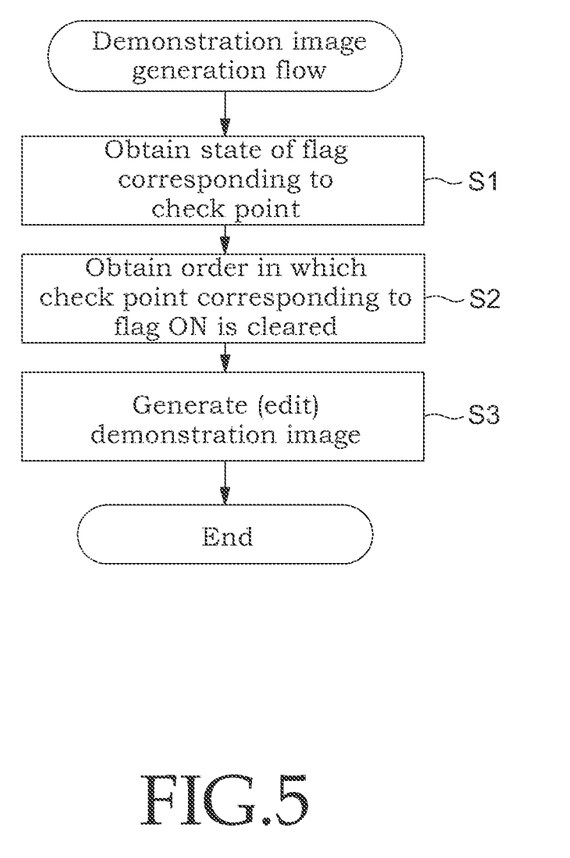
FIG. 5 is a flow chart showing an operation of the computer device which is performed when the demonstration images are generated.

FIG. 5 is a flow chart showing the operation of the computer device 1 which is performed when the demonstration image(s) to be displayed on the monitor 13 at the time of the opening is/are generated. This process is executed when the disc-type storage medium 30 and the card-type storage medium 31 are loaded into the disc drive 4 and the memory card slot 5, respectively. As shown in FIG. 5, initially, the saved data stored in the card-type storage medium 31 is read into the RAM 8, and information indicating the state(s) of the flag(s) corresponding to the check point(s) is obtained (step S1). In addition, from the saved data, information indicating the order in which the check point(s) corresponding to the flag(s) in ON-state is/are cleared is obtained (step S2). Then, based on the information obtained in step S1 and step S2, the demonstration image(s) is/are generated (step S3).

[Generation Method of Demonstration Images]

Figure 6A:
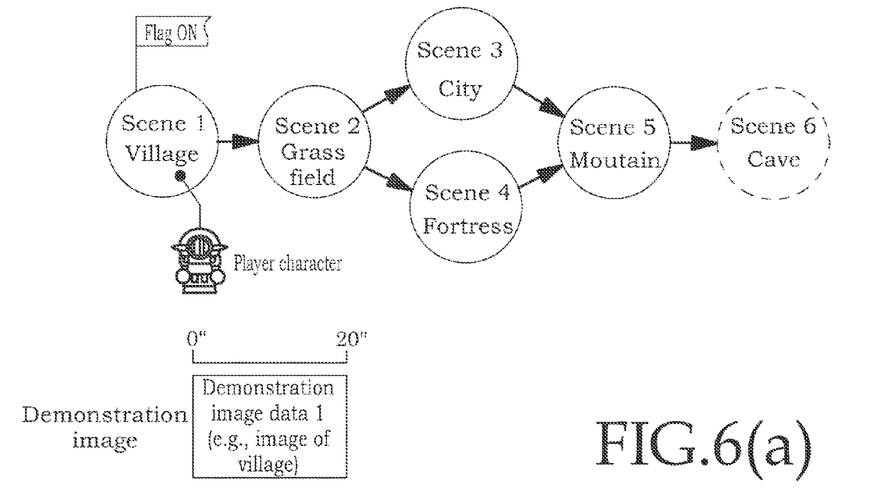
FIG. 6 is a schematic view showing a procedure for generating the demonstration images.
Figure 6B:
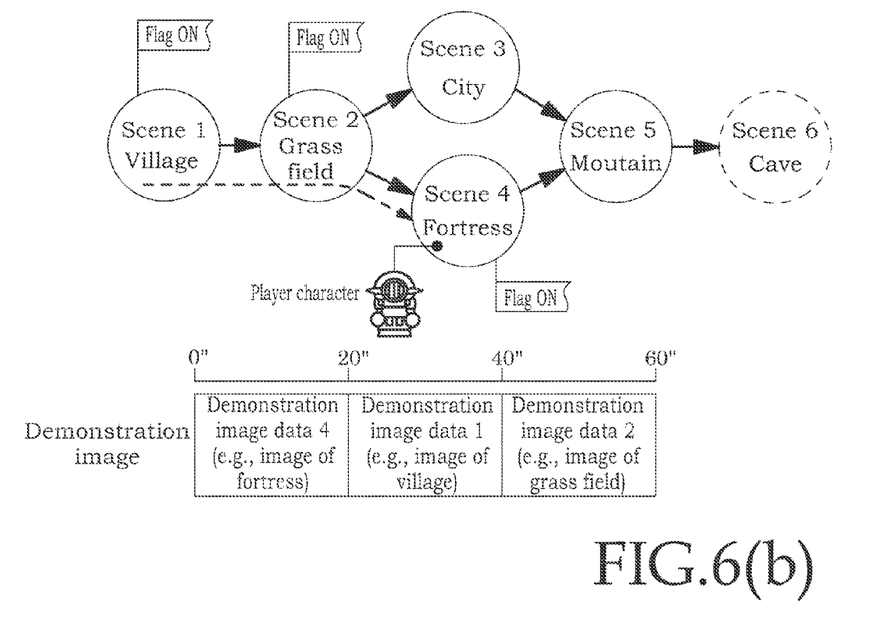

Generation of the demonstration image(s) in step S3 will be described in detail. FIG. 6 is a schematic view showing the procedure for generating the demonstration image(s). FIG. 6A shows a case where only scene 1 has been played (only the check point 1 has been cleared). FIG. 6B shows a case where the check points 1, 2, and 4 corresponding to scenes 1, 2, and 4, respectively, have been cleared. In the computer device 1 of the present embodiment, the demonstration images are edited by using only the demonstration image data corresponding to the check points having been cleared. In a case where plural check points have been cleared, the demonstration image data corresponding to the check point having been cleared most recently is output (reproduced) firstly, while the remaining demonstration data are output (reproduced) sequentially in accordance with the order in which the corresponding check points have been cleared.

For example, as shown in FIG. 6A, the case where only scene 1 has been played is a state in which only the check point 1 has been cleared. In this case, only the flag corresponding to the check point 1 is ON, and the demonstration image reproduced at the time of the opening is the image being presented for about 20 seconds, which is composed of only the demonstration image data 1 corresponding to the check point 1. By comparison, as shown in FIG. 6B, in a case where the player character has proceeded up to scene 4, the check points 1, 2, and 4 have been cleared (this state is the same as the state of the flags of FIG. 4). In this case, the flags corresponding to the check points 1, 2, and 4 are ON, whereas the flags corresponding to the check points 3, 5, and 6 are OFF. Therefore, the demonstration images are edited (generated) using the demonstration image data 1, 2, and 4 corresponding to the check points 1, 2, and 4, respectively. In a case where the check points 1, 2, and 4 have been cleared in this order, the demonstration image data 4, the demonstration image data 1, and the demonstration image data 2, are connected together in this order to be generated into the demonstration images being presented for about 60 seconds.

In step S3 of FIG. 5, the demonstration image(s) is/are generated as described above. The demonstration image generating/outputting section 45 outputs the generated demonstration image(s) to the monitor 13 at the time of the opening. Thus, the content(s) of the demonstration image(s) to be displayed in the next play can be changed according to the check points having been cleared, i.e., the state of proceeding of the main part. This can attract the user's interest on the demonstration images. Since the demonstration image data corresponding to the check point having been cleared most recently is reproduced firstly with a priority over another demonstration image data, the user can know that a new demonstration image has been added merely by seeing an initial portion of the demonstration image, which can attract the user's interest on the demonstration images more.

Although in the present embodiment, the demonstration image corresponding to the check point having been newly cleared is reproduced earlier than another demonstration image, as a configuration in which the demonstration image corresponding to the check point having been newly cleared is reproduced with a priority over another demonstration image, the present invention is not limited to this. For example, the demonstration image corresponding to the check point having been newly cleared may be selected and reproduced with a priority, and another demonstration image may not be reproduced.

In a case where the user has not played the main part at all yet and therefore the flags corresponding to all of the check points are OFF, a demonstration image dedicated to this state may be prepared and reproduced at the time of the opening. Or, the demonstration image data 1 which is an earlier phase of the main part may be reproduced as the demonstration image at the time of the opening. Or, the demonstration image data 1 and 2 may be connected together to be generated into the demonstration images, which may be reproduced at the time of the opening. For example, in the case where the demonstration images formed by connecting the demonstration image data 1 and 2 together are reproduced at the time of the opening, the demonstration image generated (edited) according to the above procedure may be reproduced on behalf of the demonstration image presented previously, at a time point when the check point (check point 3 or check point 4 in the example of FIG. 1) subsequent to the check point 2 has been cleared in actual play of the main part.

In the present game, as described with reference to FIG. 1, the story ends at the time point when the player character defeats the enemy monster appearing in a location within the "cave" in scene 6. Therefore, when the enemy monster has been defeated, this may be assumed as the check point, the flag may be turned ON, and the demonstration image prepared as corresponding to this check point may be displayed at the time of the opening. As such a demonstration image, a digest of an ending movie to be reproduced after the end of the present game may be used. Or, a dedicated image prepared in advance may be used. Thus, the demonstration image presented at the time of the opening is changed into a content which can be viewed only after the whole of the present game is cleared. This causes the user to wish to see the demonstration image after the present game has been cleared. Moreover, the number of times the main part has been cleared, or the number of times each scene has been cleared may be managed, and the demonstration image may be changed according to the number of times of them. In this case, the demonstration image is changed according to the number of times the scene or the whole game has been cleared, which causes the user to wish to play the game in repetition.

Although in the above described example, the content of the demonstration image is changed according to "state of proceeding of story" of the main part, the present invention is not limited to this. The "state of proceeding of story" includes a state of the play of the game and an outcome of the play, etc. The "main part" may have a preset start of the game and a preset end (ending) of the game, and also includes a main story and a sub-story which are different in content. The content of the demonstration image may be changed according to a state of proceeding of the sub-story as well as a state of proceeding of the main story. Moreover, for example, the content of the demonstration image may be changed according to a battle state of the player character in a simulation game of a pennant race mode of a baseball game or a war. In the case of the pennant race mode of the baseball game, in a series of game mode (story), in which the pennant race ends at a time point when the user has played games of a predetermined number of times after an opening game as a start, a content of a demonstration image may be changed according to a state of play or an outcome of play such as an outcome of winning or losing of every individual game, or whether or not the player character participates in playoff, etc.

In a case where multi-play on line is enabled and plural users play a game in a team, a content of a demonstration image may be changed according to a state of a battle of the team. In this case, the demonstration image corresponding to the state of the battle may be an image of an advantageous battle state, an image of a disadvantageous battle state, an image of winning of a battle, an image of losing of a battle, an image of play in which best ranking is attained, an image of play in which worst ranking is attained, etc., which takes place in the middle of the game. By doing so, a content of a demonstration image can be changed according to a state of play or an outcome of the play, in a game having a monotonous plot, for example, a simulation game such as a sport game or occupation (expansion) of a territory.

In a case where a player character appears in a demonstration image, a status of this player character may be reflected on the demonstration image. For example, there is a game in which the player character grows as the game proceeds such that its appearance (hair style or hair color), its body length, etc., change, or accessories (clothes, weapons) change. In this game, it may be considered that when any of the appearance, the body length, the accessories, etc., change, such a change is reflected on the player character appearing in the demonstration image. Of course, instead of the player character, a change in another character (enemy character, another player character who made a battle with or cooperated with the player character, etc.), or an object (including a room or village prepared for the player character), who/which has an element changeable as the game proceeds, may be reflected on a content to be displayed in the demonstration image.

In a game in which a character is prepared that can be selected as a player character from plural characters, the character selected as the player character may be caused to appear in a demonstration image. Moreover, in a game in which the user can edit (creates) a character as desired, the actually edited character may be caused to appear in the demonstration image. In this case, the character desired by the user is caused to appear in the demonstration image, which will attract the user's interest on the demonstration image. Also, by changing a content of a demonstration image based on a state of proceeding of a game, and an element of a player character or an object which is changeable as the game proceeds, a demonstration image that better complies with the state of proceeding of the game can be output. In this case, it is more expected that the demonstration image will attract the user's interest.

As the above described demonstration image, plural pre-render movies may be created in advance, stored in the disc-type storage medium 30, selected and output according to the state of play. Or, the demonstration image may be realized by using a real time rendering movie created according to a state of play every time it is output. In the latter case, regarding the state of play (e.g., state of battle) selected as the demonstration image, data constructing its virtual game space, information of a position and orientation of a virtual camera taking its image, and information of layout and motion of characters and objects, may be stored, images (real-time rendered movies) representing the state of proceeding or status may be generated sequentially based on the stored information and output to the monitor 13.

In a case where plural saved data used to identify a present achievement level of the game are stored in the computer device 1, the pre-render movie or the real time rendering movie may be output as described above to as to correspond to saved data of a highest achievement level, among the plural saved data. Further, when the demonstration image is output, the pre-render movie or the real time rendering movie may be output as described above so to as correspond to saved data randomly selected from plural saved data.

INDUSTRIAL APPLICABILITY

The present invention is applicable to a game program and a computer device which presents a demonstration image before a game is played.

REFERENCE CHARACTERS LIST

1 computer device
30a game program
41 virtual game space generating section
42 character motion control section
43 game proceeding control section 44 game proceeding management section
45 demonstration image generating/outputting section

The invention claimed is:

1. A computer device comprising a processor configured to execute:
   a game proceeding control module which receives a user's manipulation and in response, causes a game to proceed;
   a game proceeding management module which manages a state of proceeding of the game;
   a virtual game space generating module which generates a virtual game space including a character; and
   a demonstration image output module which outputs a demonstration image as a digest movie of content of the game to a display section connected to the computer device before the game is played;
   wherein the demonstration image output module is configured to change the demonstration image to be output to the display section before the game is played, according to the state of proceeding of the game, and to reflect an external feature including at least one of appearance, body length, and accessories of the character as a status of the character changing as the game proceeds, on the character appearing in the demonstration image.

2. The computer device according to claim 1,
   wherein a checkpoint corresponding to the state of proceeding of the game is set in the game;
   wherein the game proceeding management module is configured to manage whether or not the user has cleared the set checkpoint; and
   wherein the demonstration image output module is configured to output the demonstration image corresponding to the cleared checkpoint, to the display section.

3. The computer device according to claim 2,
   wherein the demonstration image is pre-stored in a storage section which is capable of being accessed by the computer device; and
   wherein the demonstration image output module is configured to output the demonstration image corresponding to the cleared checkpoint, of demonstration images stored in the storage section, to the display section.

4. The computer device according to claim 1,
   wherein the virtual game generating module is configured to edit the character in response to the user's manipulation, and
   wherein the demonstration image output module is configured to output the demonstration image in which the edited character appears to the display section.

5. The computer device according to claim 2,
   wherein the game proceeding management module contains the cleared checkpoint and an order in which the checkpoint is cleared such that the cleared checkpoint and the order are associated with each other;
   wherein the demonstration image output module is configured to output the demonstration image corresponding to the checkpoint having been cleared most recently with a priority over another demonstration image.

6. A method of controlling a computer device, comprising, with a processor, executing the steps of:
   receiving a user's manipulation and in response, proceeding a game;
   managing a state of proceeding of the game;
   generating a virtual game space including a character; and
   outputting a demonstration image as a digest movie of content of the game to a display section connected to the computer device before the game is played;
   wherein in the step of outputting the demonstration image, the demonstration image to be output to the display section before the game is played is changed, according to the state of proceeding of the game, and an external feature including at least one of appearance, body length, and accessories of the character as a status of the character changing as the game proceeds is reflected on the character appearing in the demonstration image, when the character appears in the demonstration image.

7. The method of controlling the computer device according claim 6,
   wherein a checkpoint corresponding to the state of proceeding of the game is set in the game;
   wherein in the step of managing the state of proceeding of the game, it is managed whether or not the user has cleared the set checkpoint; and
   wherein in the step of outputting the demonstration image, the demonstration image corresponding to the cleared checkpoint, is output to the display section.

8. The method of controlling the computer device according to claim 7,
   wherein the demonstration image is pre-stored in a storage section which is capable of being accessed by the computer device; and
   wherein in the step of outputting the demonstration image, the demonstration image corresponding to the cleared checkpoint, of demonstration images stored in the storage section, is output to the display section.

9. The method of controlling the computer device according to claim 6,
   wherein in the step of generating the virtual game space, the character is edited in response to the user's manipulation, and
   wherein in the step of outputting the demonstration image, the demonstration image in which the edited character appears is output to the display section.

10. The method of controlling the computer device according to claim 7,
    wherein in the step of managing proceeding of the game, the cleared checkpoint and an order in which the checkpoint is cleared are stored such that the cleared checkpoint and the order are associated with each other; and
    wherein in the step of outputting the demonstration image, the demonstration image corresponding to the checkpoint having been cleared most recently is output with a priority over another demonstration image.

11. A non-transitory storage medium which is computer-device-readable, and contains commands executed by a processor in the computer device, the commands causing the computer device to execute the steps of:
    receiving a user's manipulation and in response, proceeding a game;
    managing a state of proceeding of the game;
    generating a virtual game space including a character; and
    outputting a demonstration image as a digest movie of content of the game to a display section connected to the computer device before the game is played;
    wherein in the step of outputting the demonstration image, the demonstration image to be output to the display section before the game is played is changed before the game is played, according to the state of proceeding of the game, and an external feature including at least one of appearance, body length, and accessories of the character as a status of the character changing as the game proceeds is reflected on the character appearing in the demonstration image, when the character appears in the demonstration image.

12. The non-transitory storage medium which contains the commands according to claim 11,
   wherein a checkpoint corresponding to the state of proceeding of the game is set in the game;
   wherein in the step of managing the state of proceeding of the game, it is managed whether or not the user has cleared the set checkpoint; and
   wherein in the step of outputting the demonstration image, the demonstration image corresponding to the cleared checkpoint, is output to the display section.

13. The non-transitory storage medium which contains the commands according to claim 12,
   wherein the demonstration image is pre-stored in a storage section which is capable of being accessed by the computer device; and
   wherein in the step of outputting the demonstration image, the demonstration image corresponding to the cleared checkpoint, of demonstration images stored in the storage section, is output to the display section.

14. The non-transitory storage medium which contains the commands according to claim 11,
   wherein in the step of generating the virtual game space, the character is edited in response to the user's manipulation, and
   wherein in the step of outputting the demonstration image, the demonstration image in which the edited character appears is output to the display section.

15. The non-transitory storage medium which contains the commands according to claim 12,
   wherein in the step of managing proceeding of the game, the cleared checkpoint and an order in which the checkpoint is cleared are stored such that the cleared checkpoint and the order are associated with each other; and
   wherein in the step of outputting the demonstration image, the demonstration image corresponding to the checkpoint having been cleared most recently is output with a priority over another demonstration image.

* * * * *